US012514495B2

(12) United States Patent
Schroeder et al.

(10) Patent No.: US 12,514,495 B2
(45) Date of Patent: Jan. 6, 2026

(54) NEUROLOGICAL REHABILITATION AND TRAINING METHOD UTILIZING OCULOMOTOR, VISUAL AND/OR VESTIBULAR REHABILITATION TASKS ON SUBJECTS WITH PHARMACOLOGICALLY INDUCED NEUROPLASTICITY (71) Applicant: Neurolign USA, LLC, Pittsburgh, PA (US)

(72) Inventors: John Howison Schroeder, Pittsburgh, PA (US); Robin C. Ashmore, Pittsburgh, PA (US); Alexander D. Kiderman, Pittsburgh, PA (US); Peter Charles Doyle, Sherborn, MA (US)

(73) Assignee: SPRYSON INC., Middletown, DE (US)

( * ) Notice: Subject to any disclaimer, the term of this patent is extended or adjusted under 35 U.S.C. 154(b) by 1243 days.

(21) Appl. No.: 17/316,077

(22) Filed: May 10, 2021

(65) Prior Publication Data
US 2021/0330255 A1 Oct. 28, 2021

Related U.S. Application Data (63) Continuation of application No. PCT/US2019/060254, filed on Nov. 7, 2019.
(Continued)

(51) Int. Cl.
A61B 5/00 (2006.01)
A61B 3/113 (2006.01)
(Continued)

(52) U.S. Cl.
CPC ............ A61B 5/4848 (2013.01); A61B 3/113 (2013.01); A61B 5/11 (2013.01); A61B 5/4064 (2013.01);
(Continued)

(58) Field of Classification Search
CPC ....... A61B 5/4848; A61B 5/11; A61B 5/1064; A61B 3/113; A61B 5/4064; A61B 5/4863;
(Continued)

(56) References Cited

U.S. PATENT DOCUMENTS 8,585,609 B2 11/2013 Kiderman et al.
9,039,631 B2 5/2015 Kiderman et al.
(Continued)

FOREIGN PATENT DOCUMENTS

WO 2020/097320 5/2020

OTHER PUBLICATIONS

Prado, JÃ©rÃ´me, et al. "Two cortical systems for reaching in central and peripheral vision." Neuron 48.5 (2005): 849-858. (Year: 2005).*

(Continued)

Primary Examiner — Jennifer Robertson
Assistant Examiner — Nidhi N Patel
(74) Attorney, Agent, or Firm — Blynn L. Shideler; Krisanne Shideler; .BLK Law Group (57) ABSTRACT A Neurological Rehabilitation method utilizing oculomotor, visual and/or vestibular rehabilitation tasks on subjects with pharmacologically induced neuroplasticity comprising the steps of Inducing neuroplasticity in a subject through administering of a neuroplasticity medicament; Providing a oculomotor, visual and vestibular rehabilitation task platform configured to supply visual targets to a subject for oculomotor, visual and vestibular rehabilitation tasks and track and record eye movement of the subject during oculomotor, visual and vestibular rehabilitation tasks; Performing oculomotor, visual and/or vestibular rehabilitation tasks on the platform with subjects during periods of pharmacologically induced neuroplasticity. The neuroplasticity medicament (Continued)

generally is comprising at least one of an antidepressant, a Brain Derived Neuro trophic factor enhancer, a steroid, a psychedelic, valproic acid, NDRI's, lithium carbonate, Metformin, N-Acetylcystine, and Human Growth Hormone.

20 Claims, 1 Drawing Sheet

Related U.S. Application Data (60) Provisional application No. 62/757,737, filed on Nov. 8, 2018.

(51) Int. Cl.
| | | |
|---|---|---|
| *A61B 5/11* | (2006.01) | |
| *A61K 31/155* | (2006.01) | |
| *A61K 31/198* | (2006.01) | |
| *A61K 38/27* | (2006.01) | |
| *A61K 45/06* | (2006.01) | |

(52) U.S. Cl.
CPC .......... *A61K 31/155* (2013.01); *A61K 31/198* (2013.01); *A61K 38/27* (2013.01); *A61K 45/06* (2013.01); *A61B 2560/02* (2013.01)

(58) Field of Classification Search
CPC .. A61B 2560/02; A61K 31/198; A61K 38/27; A61K 31/13; A61K 31/135; A61K 31/19; A61K 31/137; A61K 31/405; A61K 31/57; A61K 31/155; A61K 31/1395; A61K 31/138; A61K 45/06; A61P 25/28; G16H 20/10; G16H 20/70

See application file for complete search history.

(56) References Cited

U.S. PATENT DOCUMENTS

| | | | |
|---|---|---|---|
| 9,039,632 B2 | 5/2015 | Kiderman et al. | |
| 2002/0091087 A1* | 7/2002 | Zhang | A61K 31/198 514/23 |
| 2010/0094161 A1 | 4/2010 | Kiderman et al. | |
| 2014/0192326 A1 | 7/2014 | Kiderman et al. | |
| 2014/0327880 A1 | 11/2014 | Kiderman et al. | |
| 2015/0335278 A1 | 11/2015 | Ashmore et al. | |
| 2016/0005320 A1* | 1/2016 | deCharms | G09B 19/00 434/236 |
| 2016/0022206 A1* | 1/2016 | Simon | A61B 5/4064 600/301 |
| 2016/0192838 A1* | 7/2016 | Hirsh | A61B 3/112 351/246 |
| 2016/0270711 A1 | 9/2016 | Ashmore et al. | |
| 2017/0216595 A1* | 8/2017 | Geva | A61N 1/20 |
| 2017/0231560 A1* | 8/2017 | Hyde | A61B 5/0002 340/870.07 |
| 2017/0354327 A1 | 12/2017 | Kiderman et al. | |
| 2018/0001184 A1* | 1/2018 | Tran | G16H 50/20 |
| 2018/0242842 A1 | 8/2018 | Balaban et al. | |
| 2019/0082954 A1 | 3/2019 | Kiderman et al. | |
| 2020/0163609 A1* | 5/2020 | Lisi | A61B 5/055 |

OTHER PUBLICATIONS

Venna, Venugopal R., et al. "Chronic metformin treatment improves poststroke angiogenesis and recovery after experimental stroke." European Journal of Neuroscience 39.12 (2014): 2129-2138. (Year: 2014).*

Christoph Kraus, Eero Castrén, Siegfried Kasper, Rupert Lanzenberger, Serotonin and Neuroplasticity—Links between molecular functional and structrual pathophysiology in depression Neuroscience and Biobehavioral Reviews, 2017, 77, pp. 317-326.

Abstract of: Costa, N-acetylcysteine treatment attenuates the cognitive impairment and synaptic plasticity loss induced by streptozotocin, Chemico-Biological Interactions,, vol. 272, 28499986, May 9, 2017 (May 9, 2017), pp. 37-46, XP085061685.

Lopez-Valdes G.E et al.: "Memantine Improves Stroke Recovery", Journal of the Russian National Stroke Association, 2014.

Ly Calvin et al.: "Psychedelics Promote Structural and Functional Neural Plasticity", Cell Reports, vol. 23, No. 11, 2018, pp. 3170-3182, XP055665051, DOI: 10.1016/j.celrep.2018.05.022.

Malek M. et al. "Effect of intra-hippocampal injection of human recombinant growth hormone on aynaptic plasticity in the nucleus basalis magnocellularislesioned aged rats". Arq Neuropsiquiatr. 2017, 75(7), pp. 477-483.

Richard E. Gans, PhD, Video-oculography is a method of recording eye movement through the use of digital video cameras the Hearing Journal: May 2001—vol. 54—Issue 5—pp. 40, 42.

Li Qs. et al. "Analysis of 23 and Me antidepressant efficacy survey data: implication of circadian rhythm and neuroplasticity in bupropion response". Transl Psychiatry. 2016, 6(9), p. e889, doi: 10.1038/tp. 20 16.171.

Ciuffreda KJ, Yadav NK, Thiagarajan P, and Ludlam DP "A Novel Computer Oculomotor Rehabilitation (COR) Program for Mild Traumatic Brain Injury (mTBI)", Brain Sci. Aug. 9, 2017;7(8). pii: E99. doi: 10.3390/brainsci7080099.

Kontos AP, Deitrick JM, Collins MW, and Mucha A. "Review of Vestibular and Oculomotor Screening and Concussion Rehabilitation", J Athl Train. Mar. 2017; 52(3):256-261. doi: 10.4085/1062-6050-51.11.05.

Abstract of: Elbin RJ, Schatz P, Lowder HB, and Kontos AP "An empirical review of treatment and rehabilitation approaches used in the acute, sub-acute, and chronic phases of recovery following sports-related concussion", Curr Treat Options Neurol. Nov. 2014; 16(11):320. doi: 10.1007/s11940-014-0320-7.

* cited by examiner

NEUROLOGICAL REHABILITATION AND TRAINING METHOD UTILIZING OCULOMOTOR, VISUAL AND/OR VESTIBULAR REHABILITATION TASKS ON SUBJECTS WITH PHARMACOLOGICALLY INDUCED NEUROPLASTICITY

RELATED APPLICATIONS

This application is a continuation of International Patent Application Serial Number PCT/US2019/060254 filed Nov. 7, 2019 titled "Neurological Rehabilitation and Training Method Utilizing Oculomotor, Visual and/or Vestibular Rehabilitation Tasks on Subjects with Pharmacologically Induced Neuroplasticity" and which published May 14, 2020 as publication number 2020/097320 which application and publication are incorporated herein by reference in its entirety.

International Patent Application Serial Number PCT/US2019/060254 claims priority to U.S. patent application Ser. No. 62/757,737 filed Nov. 8, 2018, entitled "Neurological Rehabilitation and Training Methods Utilizing Oculomotor, Visual and/or Vestibular Rehabilitation Tasks on Subjects with Pharmacologically Induced Neuroplasticity" which application is incorporated herein by reference in its entirety.

BACKGROUND OF THE INVENTION

1. Field of the Invention

This invention generally relates to neurological rehabilitation methods and training methods utilizing oculomotor, visual and/or vestibular rehabilitation tasks on subjects with pharmacologically induced neuroplasticity and systems for implementing the same.

2. Background Information

Oculomotor, visual and/or vestibular rehabilitation tasks have been implemented successfully in neurological rehabilitation regimes.

For example, the researchers Ciuffreda K J, Yadav N K, Thiagarajan P, and Ludlam D P observed in their article "A Novel Computer Oculomotor Rehabilitation (COR) Program for Mild Traumatic Brain Injury (mTBI)", Brain Sci. 2017 Aug. 9; 7(8). pii: E99. doi: 10.3390/brainsci7080099, that "Individuals with traumatic brain injury (TBI) manifest a wide range of visual dysfunctions. One of the most prevalent involves the oculomotor system, which includes version, vergence, and accommodation" and as a result they proposed and described "an oculomotor rehabilitation program that has been tested in a clinical trial in patients having TBI with a high degree of success based on before-and-after objective system recordings, performance measures, and related visual symptomotology. The basic program components include a versatile stimulus package incorporating the attentional paradigm of rapid serial visual presentation (RSVP), the ability to add a visual and/or auditory distractor to the training to increase difficulty level ("task loading"), automated assessment of RSVP errors, and automated assessment of visual performance over the training period."

Additionally of note, the researchers Kontos A P, Deitrick J M, Collins M W, and Mucha A. in their article "Review of Vestibular and Oculomotor Screening and Concussion Rehabilitation", J Athl Train. 2017 March; 52(3):256-261. doi: 10.4085/1062-6050-51.11.05, reported that "Vestibular rehabilitation and visual-oculomotor therapies involve an active, expose-recover approach to reduce impairment and symptoms. Initial results support the effectiveness of both vestibular and visual-oculomotor therapies, especially those that target specific impairments. However, the evidence supporting rehabilitation strategies for both vestibular and oculomotor impairment and symptoms is limited and involves small sample sizes, combined therapies, nonrandomized treatment groups, and lack of controls. Additional studies on the effectiveness of screening tools and rehabilitation strategies for both vestibular and oculomotor impairment and symptoms after SRC are warranted."

For further general background the researchers Elbin R J, Schatz P, Lowder H B, and Kontos AP in their publication titled "An empirical review of treatment and rehabilitation approaches used in the acute, sub-acute, and chronic phases of recovery following sports-related concussion", Curr Treat Options Neurol. 2014 November; 16(11):320. doi: 10.1007/s11940-014-0320-7, describe "Several treatment and rehabilitation approaches for sport-related concussion have been mentioned in recent consensus and position statements. These options range from the more conservative behavioral management approaches to aggressive pharmacological and therapeutic interventions. Moreover, clinical decision-making for sport-related concussion changes as symptoms and impairments persist throughout recovery. The current article provides an empirical review of proposed treatment and rehabilitation options for sport-related concussion during the acute, subacute, and chronic phases of injury."

As noted above this invention generally relates to neurological rehabilitation methods and training methods utilizing oculomotor, visual and/or vestibular rehabilitation tasks on subjects with pharmacologically induced neuroplasticity and systems for implementing the same. The term "neuroplasticity" in the context of this document is meant to cover all interpretations of plasticity, or modifiability, in the central nervous system, such as: Neurogenesis, or the creation of new neurons; Apoptosis, or the selective elimination of neurons, which is a normal part of neural re-wiring; Synaptogenesis, or the creation of new, or enhancement of existing (but not yet signaling) synapses between neurons, including branching or pruning of neural or axonal arbors; Synaptic plasticity, namely changes in the communication strength of synapses, either increasing in strength, decreasing, becoming more or less inhibited, or any other change or modulation of synapses; Changes induced by interactions with, or other changes in, other non-neural cells in the brain, e.g. glia or the peri-neural network (PNN); Changes in genetic expression, e.g. changes in expression of genes that affect brain activity, including but not limited to changes in cell receptors, neurotransmitters, or cell-signaling pathways.

The use of pharmacologically induced neuroplasticity in rehabilitation has been explored generally such as discussed in SIDYAKINA LV. et al. The Mechanisms of Neuroplasticity and Rehabilitation in Stroke Acuity". Annals of Neurology, Vol. 7, No. 1, pp. 52-56 313, which discloses a neurological rehabilitation or training method for subjects recovering from stroke implementing pharmacologically induced neuroplasticity during periods of training to restore lost functions. These training regimes fail to provide sufficient or meaningful tracking or feedback to the clinician or the patient.

From the above, it is evident that remains a need for effective oculomotor, visual and/or vestibular rehabilitation task-based neurological rehabilitation regimes and associated platforms for implementing these regimes.

SUMMARY OF THE INVENTION

The various embodiments and examples of the present invention as presented herein are understood to be illustrative of the present invention and not restrictive thereof and are non-limiting with respect to the scope of the invention.

One aspect of the present invention provides a neurological rehabilitation and or training method utilizing oculomotor, visual and/or vestibular rehabilitation tasks on subjects with pharmacologically induced neuroplasticity comprising the steps of inducing neuroplasticity in a subject through administering of a neuroplasticity medicament; providing an oculomotor, visual and vestibular rehabilitation task platform configured to supply visual targets to a subject for oculomotor, visual and vestibular rehabilitation tasks and track and record eye movement of the subject during oculomotor, visual and vestibular rehabilitation tasks; performing oculomotor, visual and/or vestibular rehabilitation tasks on the platform with subjects during periods of pharmacologically induced neuroplasticity. The neuroplasticity medicament generally is comprising at least one of an anti-depressant, a Brain Derived Neuro trophic factor enhancer, a steroid, a psychedelic, valproic acid, NDRI's, lithium carbonate, Metformin, N-Acetylcystine, and Human Growth Hormone.

These and other advantages of the present invention will be clarified in the description of the preferred embodiments taken together with the attached figures.

DESCRIPTION OF THE PREFERRED EMBODIMENTS

Figure 1:
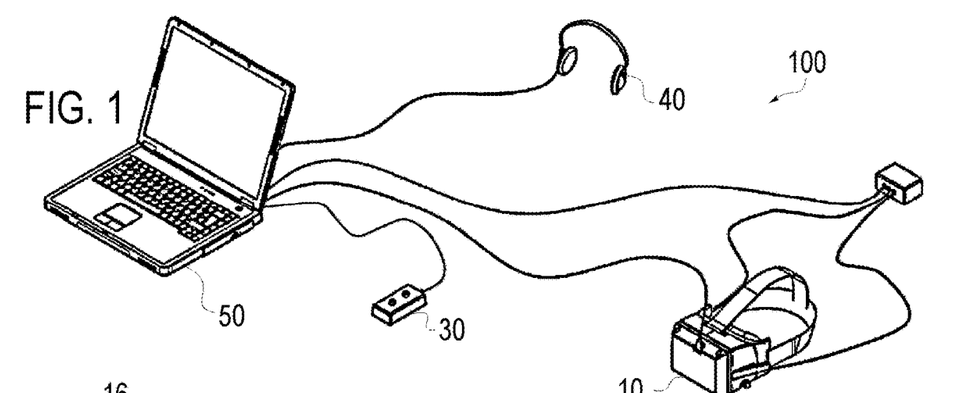
FIG. 1 is a schematic view of an oculomotor, visual and vestibular rehabilitation and training task platform for use in the present invention and configured to supply visual targets to a subject for oculomotor, visual and vestibular rehabilitation and training tasks and track and record eye movement of the subject during oculomotor, visual and vestibular rehabilitation tasks.
Figure 3:
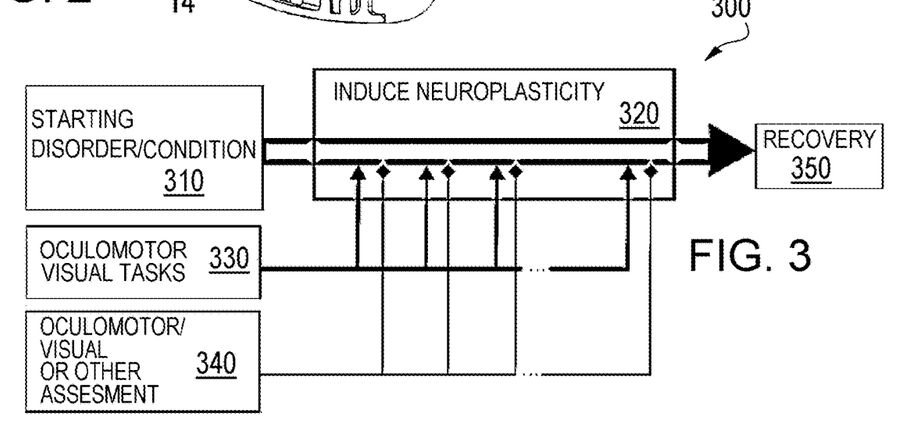
FIG. 3 schematically illustrates Targeted Neuro-Rehabilitation Enhancement methodology according to the present invention.

Generally the invention consists of a Neurological Rehabilitation or training method 300 utilizing oculomotor, visual and/or vestibular rehabilitation tasks on subjects with pharmacologically induced neuroplasticity comprising the steps of inducing neuroplasticity 320 in a subject through administering of a neuroplasticity medicament; Providing a oculomotor, visual and vestibular rehabilitation or training task platform 100 configured to supply visual and audible targets to a subject for oculomotor, visual and vestibular rehabilitation and/or training tasks, and track and record eye movement of the subject during oculomotor, visual and vestibular rehabilitation and/or training tasks; performing 330 oculomotor, visual and/or vestibular rehabilitation and/or training tasks on the platform with subjects during periods of pharmacologically induced neuroplasticity. The neuroplasticity medicament generally is comprising at least one of a selective serotonin reuptake inhibitors (SSRI), a Brain Derived Neuro trophic factor enhancer, a steroid, a psychedelic, valproic acid, NDRI's, lithium carbonate, Metformin, N-Acetylcysteine, and Human Growth Hormone.

Platform 100

One important aspect of the present invention is providing an oculomotor, visual and vestibular rehabilitation or training task platform 100 configured to supply visual and audible targets to a subject for oculomotor, visual and vestibular rehabilitation and/or training tasks and track and record eye movement of the subject during oculomotor, visual and vestibular rehabilitation or training tasks. The I-PAS™ (I-Portal® Portable Assessment System) platform 100 for Neural Functional Assessments provides a suitable platform 100 for implementing the present invention. I-PAS™ platform 100 is a portable, head-mounted, neural functional assessment tool. With its integrated clinical eye tracking and digital display 12, it slips on and off the patient as easily as a virtual reality headset. The FDA has cleared (K171884) fourteen tests and a list of variables for clinical use on the I-PAS™ platform. The testing protocols will serve for many of the rehabilitative tasks set forth herein.

The rehabilitation platform 100 of the present invention has a structure that may be categorized as a type of Video-oculography (VOG) system. VOG systems have been defined by Richard E. Gans, PhD, who is the Founder and Executive Director of the American Institute of Balance and he served on the board of the American Academy of Audiology, in the Hearing Journal: May 2001-Volume 54-Issue 5-pp 40, 42 "Video-oculography is a method of recording eye movement through the use of digital video cameras. This is a significant change from electronystagmography, which uses the corneal retinal potential, which is the eye's battery like effect. As the eyes move side to side and up and down, the cornea-retinal potential's positive and negative discharge is recorded. VOG technology, however, uses infrared cameras to measure the eye's position. Small cameras, mounted in goggles, track the center of the pupil to provide the location of the eye." Specifically, the platform 100 is formed on the I-Portal™—PAS (Portable Assessment System, manufactured and supported by Nerorolign), a portable 3D head mounted display (HMD) system with integrated eye tracking technology.

The rehabilitation and training platform 100 may also be categorized as having the structure of a videonystagmograpy (VNG) system, a subset of VNG systems, and which is often defined as a technology for testing inner ear and central motor functions, a process known as vestibular assessment and is defined as involving the use of infrared cameras to trace or track eye movements during visual stimulation and positional changes. A VNG unit is typically a diagnostic system for recording, analyzing and reporting (generally) involuntary eye movements, called nystagmus for involuntary movements, using video imaging technology. The platform 100, as described in greater detail below, may also be understood as having the structure of a VNG system, although the platform 100 when used herein is a rehabilitation and training platform 100.

The rehabilitation and training platform 100 includes the head mounted goggle unit 10, user input device 30, headphones 40 for auditory input for instructions or stimulus and/or subject isolation, coupled to a laptop 50 to yield a highly portable platform 100. The platform 100 is coupled to the subject and configured to present a plurality of virtual reality based visual stimulus to the subject. The platform 100 is designed to obtain objective physiologic response of the subject from the eye tracking unit based upon the visual stimulus presented to the subject.

Virtual environment exposure, also called virtual reality or VR, has proven highly efficient and effective in vestibular rehabilitation since the experience gained during VR exposure is transferable to the real world. The VR technology in the present invention is used to provide a visual target for performing a variety of rehabilitation and training tasks for the subject. The VR use in the rehabilitation of TBI accelerates the compensation of an acute loss of peripheral or central vestibular function by improving adaptive modifications of the vestibulo-ocular reflex. The portable platform 100 has the potential of being used bedside and in the home to increase rehabilitation compensation speed and degree.

Figure 2:
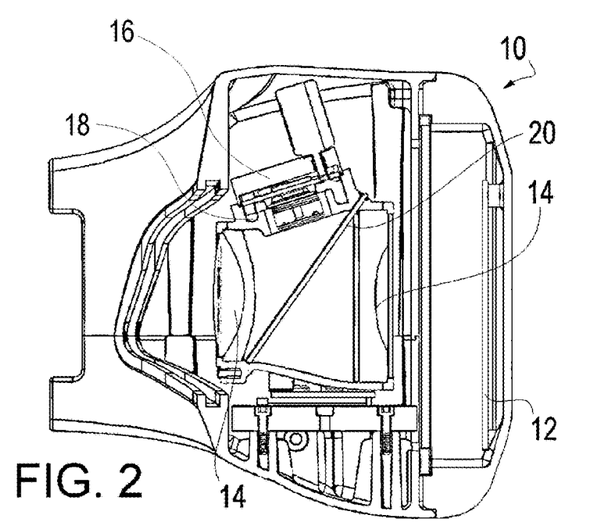
FIG. 2 is a schematic view of the rehabilitation and training platform of FIG. 1.

FIG. 2 is a schematic illustration of the design of the head mounted VOG/VNG goggle unit 10 with OLED micro display or VR screen 12, two sets of optics 14, cameras 16 for recording eye movement, typically at above 100 hz, micro LEDs 18 for illumination of the eyes, and a hot mirror. Simply, the VR screen 12 provides the visual stimulus and the cameras 16 capture eye response. The details of the VR display screen 12 are believed to be known to those or ordinary skill in the art and it allows the system 100 to present visual images or targets to the user that have a perceived or simulated distance for rehabilitation and training tasks. The eye tracking technology described herein is generally known in the art.

The combination of the eye tracking and the display of simulated distanced visual targets allows the platform 100 to automatically run a number of preprogrammed, clinician selected, neurologic rehabilitation and training tasks selected for a specific patient and to record the physiologic responses thereto. Further details of the platform 100 and its capabilities is set forth in publication number 2019-0082954. See also Publication No. 2016-0270711, Publication no. 2015-0335278, Publication No. 2014-0327880 and related U.S. Pat. No. 9,039,632; Publication No. 2014-0192326 and related U.S. Pat. No. 9,039,631; and U.S. Publication Number 2010-0094161 and related U.S. Pat. No. 8,585,609. Further note NM publication number 2018-0242842 discloses use of the platform as an objective screening platform for mTBI screening which includes a vergence testing stimulus generator, and publication 2017-0354327 disclosing further details of the platform 100 used therein as a head mounted compact goggle based video oculography system including a goggle base surrounding the subject's eyes; an angled hot mirror; at least one digital camera attached to the goggle base along the top side of the goggle base taking images of at least one of the subject's eyes via a hot mirror reflection; an integral display for selectively displaying visual stimulus to the subject through the hot mirror and attached to the goggle base along the rear side of the goggle base; a controller coupled to the display generating each visual stimulus for each neuro-otologic test to be displayed to the subject via the display and coupled to each digital camera and receiving and storing data signals there from, the controller configured to calculate eye related data from the digital camera images during each neuro-otologic test, and configured to display the eye related data to users. All of the above patents and publications are incorporated herein by reference. The I-PAS™ platform yields an oculomotor, visual and vestibular rehabilitation task platform 100 configured to supply visual and/or audible targets to a subject for oculomotor, visual and vestibular rehabilitation tasks and track and record eye movement of the subject during oculomotor, visual and vestibular rehabilitation tasks, and provide feedback to the clinician and/or the patient.

Targeted Neuro Rehabilitation Enhancement Method 300

The invention may be described as a method 300 for enhancing medical rehabilitative success in the neurological domain, hereafter referred to as Targeted Neuro-Rehabilitation Enhancement (TNRE) 300 shown schematically in FIG. 3. The fundamental principle of the method 300 is to use oculomotor, visual, and vestibular tasks during therapeutic manipulation of neuroplasticity in order to promote rehabilitation success or enhance the rehabilitation effect. The use of these tasks is chosen because of the extensive distribution of vestibular, oculomotor, and (related to both) visual function throughout multiple neuro-anatomical domains. The goal of the method is to enhance rehabilitation in: Oculomotor, visual, and vestibular/balance performance specifically, e.g. for fundamental and emergent eye movement functions such as smooth pursuit, saccades, nystagmus, and vergence; and Neurological function generally, again based on the broad anatomical distribution of vestibular, visual processing, and oculomotor control; and to enhance neurological function in adaptation to newly acquired skills (i.e. during learning of skills for medical purposes).

With respect to oculomotor performance, investigations have shown that after brain injury, rehabilitation using oculomotor tasks can improve performance in abilities relating to critical quality-of-life functions such as reading and driving. Vestibular rehabilitation can also assist with the effects and symptoms of a wide range of clinical problems. Oculomotor, visual, and vestibular rehabilitation (OVVR) tasks exercises a multitude of brain regions, potentially strengthening connections in many areas (motor, sensory, cognitive, and others) through activation and concentrated use (See Table 1). Furthermore, this form of rehabilitation exercises and enhances the precise timing and coordination of multiple inter-related sub-processes. The proposed method in this application enhances the OVVR effect by performing it in controlled concert with deliberate increases in underlying neuroplasticity and neurogenesis.

Multiple neuroplasticity medicaments for inducing neuroplasticity are indicated below. Neuroplasticity effectively creates a pliable substrate within which rehabilitation can act, allowing individual neurons and whole networks to experience efficient reconfiguration. Rehabilitation should ideally take advantage of this plasticity by exercising and enhancing configurations that are beneficial and therapeutic to the patient. Because of this, rehabilitative tasks that exercise valuable functions as well as broad general regions of neural territory are a logical choice, and OVVR tasks and tests do both.

The TNRE method 300 is schematically illustrated in FIG. 3 in which a subject begins with a given neurologic disorder or condition at 310 (detailed below). As stated above the fundamental principle of the method 300 is to use oculomotor, visual, and vestibular tasks during therapeutic manipulation of neuroplasticity in order to promote rehabilitation success or enhance the rehabilitation effect. The method 300 includes the step of inducing neuroplasticity 320 in a subject through administering of a neuroplasticity medicament. Inducing neuroplasticity within the meaning of this application means immediately after taking the drug to about one month after stop taking effective amounts of the drug, dependent upon the specifics of the medicament. The method 300 includes selecting a set of rehabilitation or training tasks for the patient and performing 330 the set of oculomotor, visual and/or vestibular rehabilitation or training tasks on the platform 100 with subjects during periods of pharmacologically induced neuroplasticity, and accessing 340 the results and repeating as needed till the patient moves to recovery 350. The specific task protocol for the patient may be adjusted based upon the assessment 340, including adding more tasks, deleting tasks and/or altering tasks.

The TNRE method 300 is defined by the following general principles of operation:
1. In the presence of a neurological dysfunction or disorder (see Disorders and Conditions list, below) 310, apply a therapeutic intervention to increase neuroplasticity 320 (see Therapeutic Intervention list, below).
2. During application of the therapy 310, perform a defined set of simultaneous oculomotor and/or vision and/or vestibular tasks (as defined in Oculomotor Visual Vestibular Tasks for TNRE, below) as rehabilitation 330 for the dysfunction or disorder. These tasks 330 are precisely controlled by a combined software and hardware of platform 100 that delivers stimuli according to a protocol selected by the clinician.
3. Periodically (on the scale of hours, days, weeks, or according to clinical visitation schedule) assess 340 the success of therapeutic intervention by applying a specific set of tests that assess the oculomotor or other neurological performance targeted. Assessment 340 may also be performed immediately or in real-time during task performance 330 (see next principle).
4. During the task, immediate visual feedback may be provided to the patient to further enhance learning and provide real-time immediate assessment 340. This feedback may be customized with feedback target goals.

Oculomotor/Visual/Vestibular Rehabilitation (OVVR) Tasks for TNRE

In the various tests, the participant observes a single light or cluster of lights (spots), displayed on display 12 in the head-mounted device 10 (or in an alternative platform projected onto a visible surface).

The participants are instructed to either (a) fixate on, (b) find, or (c) follow the dot or to either (a) follow or (b) count the spots. The eye tracking equipment 16 tracks and measures the reflexive movements or responses of the eyes.

During the subjective vertical and horizontal and reaction time tests, the participant pushes one of two buttons via input 30 in response to either (a) visual, or (b) audio stimuli.

Table 1 shows brain areas that are exercised by OVVR tasks, or that underlie the execution of behaviors exercised by the tasks, as indicated by published research results. This table is not meant to be a comprehensive list of all brain regions affected by OVVR tasks, and is included to demonstrate the potential specificity of some tasks, and broad targeting possible with multiple tasks. Neuroplasticity that is simultaneously induced by any of the items in the Therapeutic Intervention List (below) would affect multiple regions during the performance of the OVVR tasks. Within the context of the proposed method (TRNE) the brain region where this plasticity intersects with a task's supporting brain regions would be the regions where the greatest effect would be expected.

TABLE 1

Brain areas supporting and exercised by OVVR tasks
Table 1. List of eye movement behaviors and clinical VOG tests, with the brain regions on which they presumably depend, according to current research. The top half shows regions of the cerebral cortex, and the bottom half shows sub-cortical structures. Asterisks indicate approximate importance of the structures for the behavior. This table is not intended to be used for any clinical or diagnostic purpose.

|  |  | Dorsal Frontal (FEF/SEF) | Dorsal Parietal (LIP) | Inferior Parietal (MT/MST) | Occipital (V1) | Temporal | Pre-Central (M1/Pre-Motor) |
|---|---|---|---|---|---|---|---|
| Reflexive | Horiz pro saccades | *** | ** |  | * |  |  |
|  | vert pro-saccades | *** | ** |  | * |  |  |
|  | anti-saccades | *** |  |  | * |  |  |
|  | Predictive memory/sequence | *** |  |  | * |  |  |
|  |  | *** |  |  |  |  |  |
|  | self paced | *** |  |  |  |  |  |
|  | horiz | * | ** | *** | *** |  |  |
|  | vert | * | ** | *** | *** |  |  |
|  | OKN | * | ** | *** | *** |  |  |
|  | VOR |  |  |  |  |  |  |
|  | vergence |  |  |  | *** |  |  |
|  | horiz nystagmus | * |  |  |  |  |  |
|  | vert nystagmus | * |  |  |  |  |  |
| Test responses | visual react time |  |  |  |  | *** | ** |
|  | auditory react time |  |  |  |  | *** | ** |
|  | vertical judgment |  |  |  |  | *** |  |

TABLE 1-continued

Brain areas supporting and exercised by OVVR tasks
Table 1. List of eye movement behaviors and clinical VOG tests, with
the brain regions on which they presumably depend, according to
current research. The top half shows regions of the cerebral
cortex, and the bottom half shows sub-cortical structures.
Asterisks indicate approximate importance of the structures
for the behavior. This table is not intended to be used for
any clinical or diagnostic purpose.

| | | Basal Ganglia | Corpus Collosum | Cerebellum (lateral) | Thalamus (MD/IML) | Brainstem/ SC/mCB OM network | Vestibular-Auditory Periphery |
|---|---|---|---|---|---|---|---|
| Saccades | Horiz pro saccades | * | | * | | *** | |
| | vert pro-saccades | * | ** | * | | *** | |
| | anti | | | * | | *** | |
| | Predictive | | | ** | ** | *** | |
| | memory/sequence | *** | | ** | ** | *** | |
| | self paced | *** | | ** | ** | *** | |
| | horiz | * | | | | *** | |
| | vert | * | ** | * | | *** | |
| | OKN | | | | | *** | ** |
| | VOR | | | | | *** | *** |
| | vergence | | | | | *** | |
| | horiz nystagmus | | | | | *** | *** |
| | vert nystagmus | | | * | | *** | *** |
| Test responses | visual react time | | | | | * | |
| | auditory react time | | | | | | *** |
| | vertical judgment | | | | | | *** |

Abbreviations: FEF/SEF—Frontal and Supplementary Eye Fields; LIP—Lateral Interparietal area; MT/MST—Medial (Superior) Temporal area; V1—Primary Visual Cortex; M1—Primary Motor Cortex; MD/IPL—Mediodorsal and Intermedullary Lamina regions of the thalamus; SC/mCB OM—Superior Colliculus/Medial Cerebellum Oculomotor network; OKN—Optokinetic Nystagmus; VOR—Vestibular Ocular Reflex.

Test/Task Type: Oculomotor/Vestibular
Subjective Visual Horizontal and Vertical

The patient rotates a line using the left (counterclockwise) and right (clockwise) control buttons to put the line in the vertical (upright) or horizontal (flat) position. These tests are performed in darkness to remove spatially-orienting clues. These tests measure the ability of patients to sense orientation relative to gravity Example descriptive variables (outputs of these tests): mean and standard deviation of error, in degrees, away from true horizontal/vertical.

Gaze Nystagmus, Horizontal and Vertical; Spontaneous Nystagmus

In Gaze Nystagmus—Patient fixates on one or more target locations, and targets may be visible or not at different points during the test. Many abnormalities can create horizontal, vertical, and torsional nystagmus during gaze (spontaneous nystagmus tests). Example descriptive variables: Average and peak slow phase velocity for horizontal, vertical and torsional eye movement components with and without fixation, number of nystagmus beats.

Smooth Pursuit (Horizontal, Vertical, or any Arbitrary Path)

The patient is directed to follow a dot as it moves through a sinusoidal displacement of some number of degrees horizontal, run at any number of possible frequencies and cycles. The vertical variant moves the dot vertically. Other variants include movement that is not strictly sinusoidal, and can follow any visible path at any speed. Smooth pursuit abnormalities vary from low gain (Lesions: cerebral hemispheric lesions, unilateral lesions of the striate cortex, posterior cortical lesions, traumatic brain injury) to asymmetric pursuit (Schizophrenia, Advanced age, Parkinson's disease). (Example descriptive variables: Velocity gain to the right (or up for vertical) and to the left (or down for vertical), velocity gain asymmetry, velocity phase to the right (or up for vertical) and to the left (or down for vertical), percent of saccadic intrusions position gain, and initiation latency.

Optokinetic Nystagmus

Patients see a field of dots or other full field stimulus, moving on the display left or right, or at any angle, or rotationally, as a test of the optokinetic reflex (OKN), or the response of the eye to viewing the moving stimuli. Optokinetic abnormalities typically present as a low and/or asymmetric gains that can be triggered by traumatic brain injury, CNS lesions (such as floccular lesions, parietal lobe lesions), spinocerebellar ataxia (SCA), Parkinson disease, etc.) Example descriptive variables: Average slow phase gain, average slow phase asymmetry, fast phase velocity vs. amplitude, fast phase velocity asymmetry and other derived metrics.

Random Saccade (Horizontal, Vertical, or any Arbitrary Range of Locations)

The patient is directed to follow a dot as it shifts suddenly from one position to another instantaneously, with eye tracking throughout. Saccade abnormalities range from slow saccade velocity (due to spinocerebellar ataxia, Huntington, Parkinson, Whipple's disease, dementia, and many others) to slow latency (due to dysfunction in the Basal ganglia, Brainstem (PPRF), especially when velocity is also reduced. Saccadic deficits can result from focal hemispheric lesions affecting the cortical 'eye fields' bilateral frontal parietal lesions, Parkinson's disease, Traumatic brain injury, Neurodegenerative diseases and Movement disorders). Example descriptive variables: Eye peak velocity, latency, accuracy for both main saccade, and combined main and corrective saccade. Each variable is calculated separately for left and right eyes.

Self-Paced Saccade

Two dots are presented continuously to the patient, and patients are given some number of seconds to generate as many saccades as possible between the two targets. Patients with Parkinson's disease manifest difficulty in initiation and execution of movements, particularly when movements are sequential, simultaneous or repetitive. Example descriptive variables: Number of self-placed saccades, and position errors.

Predictive Saccade

The patient is presented with some number of pseudorandom saccade stimuli (0 or more) followed by saccade stimuli with a repeated displacement and timing. In obsessive—compulsive disorder (OCD), a dysfunction of neuronal circuits involving prefrontal areas and the basal ganglia is manifested in predictive saccade test. This test also measures the general ability to recognize temporal patterns. Example descriptive variables: First predicted saccade, percentage of predicted saccades, latency.

Light Reflex Test

Stimuli of varying brightness are presented to one or both eyes and pupillary responses of the eyes are measured. Abnormal pupillary light reflex is indicative of a wide array of neural problems, and is also present in individuals with autism spectrum disorders, major depression, and traumatic brain injury. Example descriptive variables: Pupil latency, constriction and re-dilation velocity, and amplitude separately from left and right pupils.

Depth/Vergence

The patient is presented with a dot moving toward and away in pursuit, saccadic, or any other arbitrary stimulus pattern in a virtual 3-dimensional space. The illusion of depth is created by optical disparity (different images shown to the 2 eyes), and patient vergence responses are recorded and assessed. Example descriptive variables: Convergence and divergence peak velocity, convergence and divergence latency, convergence, left/right pupil correlation with stimulus, and divergence time constant.

Test Type: Cognitive

Memory Guided Sequence

Patients fixate on a central target and are then presented with a sequence of random peripheral temporary targets. When the center target is extinguished, patients are directed to look at peripheral target locations as he/she remembers. Frontal Lode Lesions and Parkinson's disease are severely affected in memory-guided saccade tests. This test also measures the general ability of short-term memory. Example descriptive variables: positioning and timing errors targeting peripheral targets.

Visual Paired Comparison

Patients are instructed to look at pairs of images presented consecutively and to press a button when a repeated image appears. Some pairs (testing pairs) contain 1 image that was seen previously in the test, and 1 image that is novel. The test relies on the observation that people will look, although not always consciously, toward novel stimuli. Example descriptive variables: Time the patient spends looking at the half of the screen containing the novel image, which image they look at first, and time between viewing repeated image and button press.

Anti-Saccade

Patients are presented with a peripheral target and they are required to generate an eye movement in the opposite direction (into the contralateral hemisfield). Vertical version performs the same but saccades must be made opposite in the vertical direction. The ability to perform anti-saccade tests are impaired in Bipolar disorder, schizophrenia, Alzheimer disease, and dementia. Example descriptive variables: Pro-saccade error, anti-saccade latency, latency of pro-saccade error, anti-saccade peak velocity, accuracy of main saccade, and accuracy of main and corrective saccades.

Visual Search

A field of target stimuli is presented where at least one of those targets is different and unique from all others (e.g. a single "L" with multiple "T"s). Patient is instructed to press a button or provide other indication upon finding the differing object. Example descriptive variables: reaction time to finding the stimuli, slope of reaction times across trials of increasing difficulty. Trigger button press reaction time, search eye movement metrics, including path efficiency, mean distance from the target over time, and also whether the patient saw the target but did not respond as a possible measure of attempted deception.

Test Type: Reaction Time

Any type of disorder that is characterized by perception, information processing, or motor problems can affect reaction time. People with dementias such as Alzheimer's disease may have poor processing, which can affect response time. People with inhibition control problems or people with ADHD may also have processing speed affected, which in turns affects response time. When it comes to carrying out actions, people with Parkinson's, or motor problems like hemiparesis, may also show deficits in motor responses.

Visual/Auditory Reaction Time

Patient provides a response to a visual stimulus, or an auditory stimulus. Example descriptive variables: Average reaction time and the SD of the reaction time.

Saccade and Visual Reaction Time

Saccadic stimuli are randomly projected. The patient is directed to look at a stimulus (saccadic stimulus) and then press either the left or right button to record whether the stimulus was projected to the right or to the left. Vertical version uses up or down stimuli and responses. Example descriptive variables: Same descriptive variables as regular saccade along with latency, SD, and percent of error for each direction.

Test Type: Vestibular

Vestibular Ocular Reflex (VOR) Tasks

The human vestibular system monitors the motion and position of the head in space by detecting angular and linear acceleration. A partial or complete deficit of any of the vestibular organs, i.e. the six semicircular canals and four otolith organs, may result in mild or severe vestibular problems manifesting as dizziness or imbalance. As many as 35% of adults aged 40 years or older in the United States—approximately 69 million Americans—have experienced some form of vestibular dysfunction. Neurosensory effects of mild traumatic brain injury (mTBI) are among the most common sequela seen after mTBI, with balance-related findings chief among these. The most common vestibular disorder, benign paroxysmal positional vertigo (BPPV), affects all vestibular canals.

VOR tests include: Sinusoidal Harmonic Acceleration; Subject is rotated back and forth sinusoidally in the dark at frequency of 0.01 to 1.75 Hz with a peak velocity of 60 deg/second (Example descriptive variables: average VOR gain, asymmetry and phase); Visual Suppression or Visual Fixation (VF); Subject is rotated back and forth sinusoidally at frequency of 0.01 to 1.75 Hz with a peak velocity of 60 deg/sec. Subject is directed to fixate on laser dot that moves with patient (Example descriptive variables: Average VOR gain and asymmetry); Visual Enhancement (VVOR); Subject is rotated back and forth sinusoidally at frequency of 0.01 to 1.75 Hz with a peak velocity of 60 deg/sec. The optokinetic stimulus (or any full-field visual stimulus) is presented during this rotation (Example descriptive variables: Average VOR gain, asymmetry and phase); controlled rotational Head Impulse Test (crHIT) where Subject is rotated briefly in a pseudo-random direction, wherein accelerations between 750 to 1500 deg/sect are typical for this test, and subjects are directed to fixate on a central target during rotation (Example descriptive variables: Average VOR gain to the left and right and asymmetry); and Step Test; Subject is rotated CW and then CCW at constant speed up to 240 deg/sec in the dark (Example descriptive variables: Average VOR gain, asymmetry and decay time).

Therapeutic Neuroplasticity Medicaments—SSRI

As discussed above generally the invention consists of a Neurological Rehabilitation or training method 300 utilizing oculomotor, visual and/or vestibular rehabilitation tasks on subjects with pharmacologically induced neuroplasticity comprising the steps of inducing neuroplasticity 320 in a subject through administering of a neuroplasticity medicament. The first class of neuroplasticity medicaments for use with the present invention are Selective serotonin reuptake inhibitors (SSRIs). Selective serotonin reuptake inhibitors (SSRIs) are a class of drugs that are typically used as antidepressants in the treatment of major depressive disorder and anxiety disorders. SSRIs are believed to increase the extracellular level of the neurotransmitter serotonin by limiting its reabsorption (reuptake) into the presynaptic cell, increasing the level of serotonin in the synaptic cleft available to bind to the postsynaptic receptor. They have varying degrees of selectivity for the other monoamine transporters, with pure SSRIs having only weak affinity for the norepinephrine and dopamine transporters. SSRIs are the most widely prescribed antidepressants in many countries.

One SSRI which may be used within the context of the present invention is Citalopram (brand names: CELEXA, CIPRAMIL and others). Citalopram is an antidepressant drug of the selective serotonin reuptake inhibitor (SSRI) class. It has U.S. Food and Drug Administration approval to treat major depression, which it received in 1998, and is prescribed off-label for other conditions. In Australia, the UK, Germany, Portugal, Poland, and most European countries, it is licensed for depressive episodes and panic disorder with or without agoraphobia. In Spain and Denmark it is also used for obsessive—compulsive disorder.

Another SSRI which may be used within the context of the present invention is Escitalopram, sold under the brand names CIPRALEX and LEXAPRO among others. Escitalopram is an antidepressant of the selective serotonin reuptake inhibitor (SSRI) class. Escitalopram is mainly used to treat major depressive disorder or generalized anxiety disorder. Escitalopram is the (S)-stereoisomer of the earlier medication citalopram, hence the name escitalopram. Escitalopram was approved for medical use in the United States in 2002. Escitalopram is sometimes replaced by twice the dose of citalopram.

Another SSRI which may be used within the context of the present invention is Fluoxetine, also known by trade names PROZAC and SARAFEM, among others. Fluoxetine is an antidepressant of the selective serotonin reuptake inhibitor (SSRI) class and is used for the treatment of major depressive disorder, obsessive-compulsive disorder (OCD), bulimia nervosa, panic disorder and premenstrual dysphoric disorder. Fluoxetine was discovered by Eli Lilly and Company in 1972 and entered medical use in 1986. It is on the World Health Organization's List of Essential Medicines, the most effective and safe medicines needed in a health system.

Another SSRI which may be used within the context of the present invention is Fluvoxamine, sold under the brand name LUVOX among others, is a medication which is used primarily for the treatment of obsessive-compulsive disorder (OCD), and is also used to treat major depressive disorder and anxiety disorders such as panic disorder and posttraumatic stress disorder. Fluvoxamine CR (controlled release) is approved to treat social anxiety disorder in the United States.[6] It is a selective serotonin reuptake inhibitor (SSRI) and $\sigma_1$ receptor agonist.

Another SSRI which may be used within the context of the present invention is paroxetine, also known by trade names including PAXIL and SEROXAT among others, is an antidepressant of the selective serotonin reuptake inhibitor (SSRI) class. It is used to treat major depressive disorder, obsessive-compulsive disorder, social anxiety disorder, panic disorder, posttraumatic stress disorder, generalized anxiety disorder and premenstrual dysphoric disorder. It has also been used in the treatment of hot flashes and night sweats associated with menopause. Marketing of the drug began in 1992 by the pharmaceutical company SmithKline Beecham, known since 2000 as GlaxoSmithKline.

Another SSRI which may be used within the context of the present invention is sertraline, sold under the trade name ZOLOFT among others, is an antidepressant of the selective serotonin reuptake inhibitor (SSRI) class. It is primarily used for major depressive disorder, obsessive-compulsive disorder, panic disorder, and social anxiety disorder. Sertraline was approved for medical use in the United States in 1991 and initially sold by Pfizer. In 2016, it was the most prescribed psychiatric medication in the United States, with over 41 million prescriptions in 2013.

Another SSRI which may be used within the context of the present invention is dapoxetine, marketed as PRILIGY and WESTOXETIN, among and other brands. As a member of the selective serotonin reuptake inhibitor (SSRI) family, dapoxetine was initially created as an antidepressant. However, unlike other SSRIs, dapoxetine is absorbed and eliminated rapidly in the body, which may yield advantages in select therapies of the invention where long lasting effects of the medicament within the subject are to be avoided.

Another possible SSRI which possibly may be used within the context of the present invention is indalpine briefly marketed under the brand name UPSTENE. Indalpine is or was a selective serotonin reuptake inhibitor (SSRI) class drug that was briefly marketed. It was discovered in 1977 by the pharmacologists Le Fur and Uzan at Pharmuka, a small French pharmaceutical firm, who credit Baron Shopsin and his colleagues at NYU-Bellevue/NYU School of Medicine in New York with providing the basis for their work. Shortly after the introduction of indalpine, concerns among some Common Market countries and activist groups about the potential of SSRIs in general to induce adverse effects, and the reported association between indalpine and hematological effects, indalpine was abruptly taken off the market. Irish psychiatrist David Healy characterized indalpine as being "born at the wrong time" during a period when "indalpine and psychiatry was under siege" by different interest groups in some of the Common Market countries.

Zimelidine, previously sold under the brand names Zimeldine, Normud, and Zelmid) is another previously available SSRI that theoretically would be effective in the present invention. Zimelidine was one of the first selective serotonin reuptake inhibitor (SSRI) antidepressants to be marketed. It is a pyridylallylamine, and is structurally different from other antidepressants. Zimelidine was developed in the late 1970s and early 1980s by Arvid Carlsson, who was then working for the Swedish company Astra AB. While zilmelidine had a very favorable safety profile, within a year and a half of its introduction, rare case reports of Guillain-Barré syndrome emerged that appeared to be caused by the drug, prompting its manufacturer to withdraw it from the market.

Alaproclate is another SSRI that theoretically would be effective in the present invention. Alaproclate is a drug that was being developed as an antidepressant by the Swedish pharmaceutical company Astra AB (now AstraZeneca) in the 1970s. It acts as a selective serotonin reuptake inhibitor (SSRI), and along with zimelidine and indalpine, was one of the first of its kind. Development was discontinued due to the observation of liver complications in some rodent studies. In addition to its SSRI properties, alaproclate has been found to act as a non-competitive NMDA receptor antagonist, but does not have discriminative stimulus properties.

Femoxetine is another SSRI that theoretically would be effective in the present invention. Femoxetine is a drug related to paroxetine that was being developed as an antidepressant by Danish pharmaceutical company Ferrosan in 1975 before acquisition by Novo Nordisk. It acts as a selective serotonin reuptake inhibitor (SSRI). Development was halted to focus attention on paroxetine instead, given femoxetine's inability to be administered as a daily pill and femoxetine died from neglect.

Ifoxetine is another SSRI that theoretically would be effective in the present invention. Ifoxetine is a selective serotonin reuptake inhibitor (SSRI) which was investigated as an antidepressant in the 1980s but was never marketed. Ifoxetine selectively blocks the reuptake of serotonin in the brain supposedly without affecting it in the periphery. Supporting this claim, ifoxetine was found to be efficacious in clinical trials and was very well tolerated, producing almost no physical side effects or other complaints of significant concern.

Other theoretical possible SSRI for use in the present invention include Omiloxetine which underwent preclinical development by the Spanish pharmaceutical company, Ferrer Internacional, until 2005, when it was abandoned; Panuramine which was synthesized in 1981 by Wyeth and which acts as a potent and selective serotonin reuptake inhibitor (SSRI), but was never marketed; and Pirandamine a tricyclic derivative which acts as a selective serotonin reuptake inhibitor (SSRI) that was investigated in the 1970s as a potential antidepressant but clinical development was not commenced and it was never marketed.

Regarding the above identified SSRIs, fluoxetine sertraline, citalopram, and escitalopram represent a preferred subset of suitable SSRI to be used in the present invention. It is noteworthy that beginning Apr. 5, 2010, this set of four antidepressant drugs became the only such drugs that the FAA permitted for pilots with authorization from an aviation medical examiner.

One manifestation of the method will be the use of OVVR in combination with SSRI medication, in the context of brain injury rehabilitation. It has been suggested that SSRI medication, such as fluoxetine sertraline, citalopram, and escitalopram in particular, induce a form of plasticity that is similar in important respects to plasticity seen in juvenile neuronal networks. Particularly these medications have been shown to increase plasticity in hippocampal dentate gyrus (DG) cells, which is a well-documented site underlying new learning. Further research has demonstrated increases in neuroplasticity or markers of neuroplasticity in other areas such as the visual cortex, amygdala, and medial pre-frontal cortex with select SSRI medicaments. In patients with mood disorders, SSRIs will be most effective when combined with other therapy (e.g. Cognitive-Behavorial, CBT), and the present invention yields effectiveness by combining neuroplasticity from SSRIs with a targeting intervention (CBT). The method described herein uses an intervention that exercises fundamental neuro-behavioral systems.

Therapeutic Neuroplasticity Medicaments—Brain Derived Neuro Trophic Factor Enhancer Another manifestation of the method will be to use OVVR in combination with pharmacological medicament therapies designed to enhance Brain-derived Neuro-trophic factor (BDNF) action for promoting neuroplasticity. Brain-Derived Neurotrophic Factor (BDNF) is considered an important protein that influences brain function as well as the peripheral nervous system. BDNF influences a variety of functions including: preventing death of existing brain cells, inducing the growth of new neurons (neurogenesis) and synapses, and supporting cognitive function. Low levels of BDNF are often problematic and have been linked to: Alzheimer's, accelerated aging, poor neural development, neurotransmitter dysfunction, obesity, depression, and even schizophrenia. BNDF signaling (particularly through its TrkB receptor target) forms a critical component in multiple types of neuroplasticity-enhancing interventions. Evidence suggests that its expression is influenced by increased neural activity, which rehabilitation tasks are meant to provide. The second class of neuroplasticity medicaments of the present invention is BDNF enhancers.

BDNF enhancing pharmacological medicaments useful within the scope of the present invention include ketamine and its metabolic derivatives norketamine and hydroxynorketamine (HNK); memantine; riluzole; icariin and therapeutic administration of botanicals with BDNF effect (e.g. ginsenosides, salidroside, glycosides, *Ginkgo biloba*, *Hypericum perforatum*).

Ketamine, sold under the brand name KETALAR among others, is a medication mainly used for starting and maintaining anesthesia. It induces a trance-like state while providing pain relief and sedation. Ketamine was discovered in 1962, first tested in humans in 1964, and was approved for use in the United States in 1970. Shortly after its US approval, it was extensively used for surgical anesthesia in the Vietnam War, due to its safety. It is on the World Health Organization's List of Essential Medicines, the most effective and safe medicines needed in a health system. Ketamine has been associated with an increased expression of brain-derived neurotrophic factor (BDNF).

Memantine is a medium-affinity uncompetitive N-methyl-d-aspartate receptor antagonist and has been clinically used as a neuroprotective agent to treat Alzheimer's and Parkinson's diseases. It acts on the glutamatergic system by blocking NMDA receptors. It was first synthesized by Eli Lilly and Company in 1968. Memantine at a clinically relevant doses has been found to markedly increase BDNF.

Riluzole, marketed as RILUTEK, TEGLUTIK and TIGLUTIK is a drug used to treat amyotrophic lateral sclerosis and riluzole has been found to enhance BDNF levels in the serum of patients. Riluzole was approved in the United States for the treatment of ALS by the FDA in 1995 and it was created by French pharmaceutical giant Rhone Poulenc Rorer, now known as Sanofi.

Icariin is a chemical compound classified as a prenylated flavonol glycoside, a type of flavonoid. It is the 8-prenyl derivative of kaempferol 3,7-O-diglucoside. The compound has been isolated from several species of plant belonging to the genus Epimedium which are commonly known as Horny Goat Weed or Yin Yang Huo. Icariin has been found to significantly increase sucrose intake and hippocampal BDNF levels in subjects. As icariin is isolated from a botanical (Homey Goat Weed), the present invention contemplates therapeutic administration of pharmaceutically effective amounts of medicinal botanicals with BDNF increasing effects (e.g. ginsenosides, salidroside, glycosides, *Ginkgo biloba*, Epimedium or horny goat weed, *Hypericum perforatum*).

Therapeutic Neuroplasticity Medicaments—Steroids

Another manifestation of the method will be the use of OVVR in combination with neuroplasticity medicaments in the form of steroids, such as Neurosteroids (Pregnenolone, Dehydroepiandrosterone, Allopregnanolone, and their synthetic analogs); and human sex hormones i.e. testosterone, estrogen, and progesterone.

Neurosteroids, also known as neuroactive steroids, are endogenous or exogenous steroids that rapidly alter neuronal excitability through interaction with ligand-gated ion channels and other cell surface receptors. The phrase, neuroactive steroid refers to steroids that can be synthesized in the brain, or are synthesized by an endocrine gland, that then reach the brain through the bloodstream and have effects on brain function. Neurosteroids have a wide range of potential clinical applications from sedation to treatment of epilepsy and traumatic brain injury. Neurosteroids can affect neuroplasticity and neurogenesis through their actions on DNA gene transcription and possibly more directly through neurotransmitter receptors and receptor modulation. Neurosteroids, by acting on the relevant targets, can regulate neurogenesis, structural and functional plasticity.

Human sex steroids, i.e. testosterone, estrogen, and progesterone are well known to have strong effects on neuroplasticity, and this manifestation of the method incorporates their potential benefit in rehabilitative therapy. Thus human sex steroids represent useful neuroplasticity medicaments for the method 300.

Therapeutic Neuroplasticity Medicaments—Psychedelics

Another manifestation of the method will be the use of OVVR in combination with neuroplasticity medicaments in the form of pharmacological psychedelics, which have been shown to promote neuroplasticity both structurally and functionally, including but not limited to: tryptamines (N,N-dimethyltryptamine [DMT] and psilocin) amphetamines (2,5-dimethoxy-4-iodoamphetamine [DOI] and MDMA) ergolines (lysergic acid diethylamide [LSD]). Psychedelics are a generally class of drug whose primary action is to trigger psychedelic experiences via serotonin receptor agonism causing thought and visual/auditory changes, and altered state of consciousness.

Tryptamine is a monoamine alkaloid. It contains an indole ring structure, and is structurally similar to the amino acid tryptophan, from which the name derives. Amphetamine (contracted from alpha-methylphenethylamine) is a potent central nervous system (CNS) stimulant that is used in the treatment of attention deficit hyperactivity disorder (ADHD), narcolepsy, and obesity. Amphetamine was first discovered in 1887 and historically, it has been used to treat nasal congestion and depression Amphetamine is also used as an athletic performance enhancer and cognitive enhancer, and recreationally as an aphrodisiac and euphoriant. At therapeutic doses, amphetamine causes emotional and cognitive effects such as euphoria, change in desire for sex, increased wakefulness, and improved cognitive control. It induces physical effects such as improved reaction time, fatigue resistance, and increased muscle strength. Ergoline derivatives comprise a diverse group of chemical compounds whose structural skeleton is the alkaloid ergoline. Researchers have found psychedelics, specifically DOI, DMT, and LSD, can change brain cells in rats and flies, making neurons more likely to branch out and connect with one another.

Therapeutic Neuroplasticity Medicaments—Misc.

Another manifestation of the method will be the use of OVVR in combination with other therapeutic neuroplasticity medicaments that induce neuroplasticity such as neurogenesis but are not grouped into classes of drugs above.

These miscellaneous neuroplasticity medicaments include Valproic Acid. Valproate (VPA), and its valproic acid, sodium valproate, and valproate semisodium forms, are medications primarily used to treat epilepsy and bipolar disorder and to prevent migraine headaches. Valproate was first made in 1881 and came into medical use in 1962. Valproate is included in the World Health Organization's List of Essential Medicines, the most effective and safe medicines needed in a health system. It is marketed under the brand names Depakote and Epilim, among others. VPA's role as a neuroplasticity medicaments is known although the specific mechanism is not fully explained. A 2000 and a 2001 study have suggested that VPA seems to activate MAP kinases which play a role in mediating long-term neuroplastic events by effecting neurotropic factors such as Nerve Growth Factor (NGF) and Brain derived neurotrophic factor (BDNF) to promote neurite growth, although the conclusions on these mechanics are not certain.

These miscellaneous neuroplasticity medicaments may include Non-SSRI antidepressants. After the introduction of selective serotonin reuptake inhibitors (SSRIs), a plethora of other groups followed, identified by their main mechanisms of activity: serotonin and norepinephrine reuptake inhibitors (SNRI); serotonin modulators and stimulators (SMS); serotonin antagonists and reuptake inhibitors (SARI); noradrenergic and selective serotonergic antidepressants (NaSSA); norepinephrine reuptake inhibitors (NeRI); serotonin, norepinephrine and dopamine reuptake inhibitors (SNDRI) or triple reuptake inhibitors (TRI); and melatonin and serotonin agonists (MaSA). SSRIs are still the most widely used and well known and well understood antidepressants, the other groups are increasingly being used in the current therapeutic settings obtaining comparable clinical results, and with tolerability and safety profiles comparable to or even provide significant advantages over those of SSRIs. Additionally Tricyclic antidepressants (TCAs) are a class of antidepressants discovered in the early 1950s and were marketed later in the decade, and they have been largely replaced in clinical use in most parts of the world by newer antidepressants. Some of these other classes of Non-SSRI antidepressants will also yield neuroplasticity and may be utilized in the present invention.

These miscellaneous neuroplasticity medicaments include lithium carbonate which is an inorganic compound, the lithium salt of carbonate, and is used for the treatment of bipolar disorder, and it is on the World Health Organization's List of Essential Medicines, the most important medications needed in a basic health system. Studies have pointed to positive effects of lithium on neurogenesis, brain remodeling, angiogenesis, mesenchymal stem cells functioning.

These miscellaneous neuroplasticity medicaments include Metformin marketed under the trade name GLUCOPHAGE among others, is used for the treatment of type 2 diabetes and in the treatment of polycystic ovary syndrome (PCOS). Metformin was discovered in 1922. and was introduced as a medication in France in 1957 and the United States in 1995. It is on the World Health Organization's List of Essential Medicines, the most effective and safe medicines needed in a health system. Metaformin has been observed to be accompanied by beneficial neuroplasticity changes.

These miscellaneous neuroplasticity medicaments include Metformin Acetylcysteine, also known as N-acetylcysteine (NAC), which is a medication that is used to treat paracetamol (acetaminophen) overdose, and to loosen thick mucus in individuals with cystic fibrosis or chronic obstructive pulmonary disease. Acetylcysteine was initially patented in 1960 and licensed for use in 1968. It is on the World Health Organization's List of Essential Medicines, the most effective and safe medicines needed in a health system. N-acetylcysteine has been shown to restores synaptic plasticity and limits gray matter injury.

These miscellaneous neuroplasticity medicaments include Human growth hormone [hGH or HGH] which is a peptide hormone that stimulates growth, cell reproduction, and cell regeneration in humans. A recombinant form of hGH called somatropin is used as a prescription drug to treat children's growth disorders and adult growth hormone deficiency. HGH is still considered a very complex hormone, and many of its functions are still unknown, however it has shown a positive effect on neurogenesis.

Other Neuroplasticity Enhancements

As discussed above the invention consists of a Neurological Rehabilitation or training method 300 utilizing oculomotor, visual and/or vestibular rehabilitation tasks on subjects with pharmacologically induced neuroplasticity comprising the steps of inducing neuroplasticity 320 in a subject through administering of a neuroplasticity medicament. However, there are other non-pharmaceutical therapies that can enhance neuroplasticity in subjects and these may be used in conjunction with the neuroplasticity medicaments of the invention. For example, a physical exercise regimen that is specifically intended to improve neuroplasticity in a neurodegenerative or brain injury context, e.g. in stroke or traumatic brain injury (TBI) recovery. Research has established that certain types of exercise programs can induce neuroplasticity, in part through BNDF. Additionally, to be considered to supplement the present invention include Stem cells and other cellular therapies, Electroconvulsive therapy, Transcranial Magnetic Therapy, Direct Transcranial Electrical Brain stimulation, Transcranial Near-Infrared Phototherapy (or any combination of these treatment modalities Disorders and Conditions 310

The following is a list of disorders and conditions 310 which may benefit from the proposed method, and for which rehabilitation is appropriate and feasible. This list provides examples, and is not meant to be an exhaustive enumeration of all conditions to which the proposed method can be applied. For example in training, such as training of a fighter pilot, training of a athlete (hockey goalie, baseball for batting, etc.), the condition may simply be the current state of oculomotor control that is attempted t be improved or enhanced.

1. Traumatic Brain injury, mild or moderate, and concussion.
2. Brain injury due to exposure to neurotoxins.
3. Stroke, ischemia or hemorrhage.
4. Neurodegenerative conditions and diseases:
    a. Alzheimer's
    b. Parkinson's
    c. Frontotemporal Dementias
    d. Huntington's
    e. Amyotrophic lateral sclerosis While this invention has been particularly shown and described with references to the preferred embodiments thereof, it will be understood by those skilled in the art that various changes in form and details may be made therein without departing from the scope of the invention.

What is claimed is:

1. A neurological rehabilitation method for a stroke patient comprising the steps of
   A) inducing neuroplasticity in a stroke patient through administering of a neuroplasticity medicament, wherein the neuroplasticity medicament comprises metformin;
   B) providing a head mounted oculomotor, visual and vestibular rehabilitation task platform configured to supply visual targets on a head mounted display to the patient for oculomotor, visual and vestibular rehabilitation and track and record eye movement of the patient during oculomotor, visual and vestibular rehabilitation tasks, and to provide feedback to a clinician and the patient;
   C) performing oculomotor, visual and/or vestibular rehabilitation tasks on the head mounted platform with the head mounted display with subjects during periods of pharmacologically induced neuroplasticity, wherein the tasks include a plurality of:
      i) a subjective visual horizontal task in which the patient rotates a visible line shown on the head mounted display to position the line in a perceived horizontal position;
      ii) a subjective visual vertical task in which the patient rotates a visible line shown on the head mounted display to position the line in a perceived vertical position;
      iii) a gaze nystagmus task in which the patient focuses on a target location within the head mounted display and the platform obtains vertical, horizontal and torsional nystagmus measurements of each eye;
      iv) a horizontal smooth pursuit task in which the patient is directed to follow a visible dot shown on the head mounted display as it moves through a horizontal sinusoidal displacement;
      v) a vertical smooth pursuit task in which the patient is directed to follow a visible dot shown on the head mounted display as it moves through a vertical sinusoidal displacement;
      vi) an optokinetic reflex testing task with visible stimuli shown moving on the head mounted display;
      vii) a random horizontal saccade task in which the patient is directed to follow a visible dot shown on the head mounted display as it shifts suddenly from one position on the head mounted display to another horizontally shifted position on the head mounted display instantaneously;
      viii) a random vertical saccade task in which the patient is directed to follow a visible dot shown on the head mounted display as it shifts suddenly from one position on the head mounted display to another vertically shifted position on the head mounted display instantaneously;

ix) a self-paced saccade task in which two stationary visible dots are presented on the head mounted display and the patient is instructed to generate as many saccades as possible between the two visible dots within a set time period;

x) a predictive saccade task in which patient is presented with a number of pseudo-random saccade stimuli on the head mounted display followed by saccade stimuli on the head mounted display with a repeated displacement and timing;

xi) a light reflex task in which the visible stimuli of varying brightness are presented to the patient on the head mounted display with the platform obtaining pupillary responses;

xii) a vergence task in which the patient is presented with a visible dot on the head mounted display virtually moving toward and away from the patient with the platform recording the vergence responses of the patient's eyes;

xiii) a memory guided sequence task in which the patient are then presented with a sequence of random peripheral temporary visible targets on the head mounted display and subsequently the patient is are directed to look at peripheral target locations on the head mounted display from memory;

xiv) a visual paired comparison task in which the patient is instructed to look at pairs of images presented consecutively on the head mounted display and to indicate when a repeated image appears;

XV) an anti-saccade task in which the patient is presented with a peripheral visible targets on the head mounted display and the patient is instructed to generate an eye movement in the opposite direction; and xvi) a visual search task in which a field of target visible stimuli is presented on the head mounted display where at least one of those targets is different from majority of the remaining targets;

D) assessing the patient's performance of the tasks performed on the platform during periods of the subject's pharmacologically induced neuroplasticity; and E) repeating steps A-D.

2. The neurological rehabilitation method for a stroke patient according to claim 1 wherein the tasks include at least five of the tasks listed in C) i)-xvi).

3. The neurological rehabilitation method for a stroke patient according to claim 1 wherein the tasks include at least the anti-saccade task.

4. The neurological rehabilitation method for a stroke patient according to claim 1 wherein the tasks include at least the memory guided sequence task.

5. The neurological rehabilitation method for a stroke patient according to claim 1 wherein the visual and/or vestibular rehabilitation or training tasks performed on the platform with subjects during periods of pharmacologically induced neuroplasticity which are repeated are modified based upon the assessment of prior performances.

6. The neurological rehabilitation method for a stroke patient according to claim 1 wherein the tasks include at least ten of the tasks listed in C) i)-xvi).

7. The neurological rehabilitation method for a stroke patient according to claim 1 wherein the tasks include at least the vergence task.

8. The neurological rehabilitation method for a stroke patient according to claim 1 wherein the tasks include at least one of the subjective visual horizontal task and the subjective visual vertical task.

9. The neurological rehabilitation method for a stroke patient according to claim 1 wherein the tasks include at least one of the horizontal smooth pursuit task and the vertical smooth pursuit task.

10. The neurological rehabilitation method for a stroke patient according to claim 1 wherein the tasks include at least one of the random horizontal saccade task and the random vertical saccade task.

11. A neurological rehabilitation method for a traumatic brain injury patient comprising the steps of A) inducing neuroplasticity in a traumatic brain injury patient through administering of a neuroplasticity medicament, wherein the neuroplasticity medicament comprises metformin;

B) providing a head mounted oculomotor, visual and vestibular rehabilitation task platform configured to supply visual targets on a head mounted display to the patient for oculomotor, visual and vestibular rehabilitation and track and record eye movement of the patient during oculomotor, visual and vestibular rehabilitation tasks, and to provide feedback to a clinician and the patient;

C) performing oculomotor, visual and/or vestibular rehabilitation tasks on the head mounted platform with the head mounted display with subjects during periods of pharmacologically induced neuroplasticity, wherein the tasks include a plurality of:

i) a subjective visual horizontal task in which the patient rotates a visible line shown on the head mounted display to position the line in a perceived horizontal position;

ii) a subjective visual vertical task in which the patient rotates a visible line shown on the head mounted display to position the line in a perceived vertical position;

iii) a gaze nystagmus task in which the patient focuses on a target location within the head mounted display and the platform obtains vertical, horizontal and torsional nystagmus measurements of each eye;

iv) a horizontal smooth pursuit task in which the patient is directed to follow a visible dot shown on the head mounted display as it moves through a horizontal sinusoidal displacement;

v) a vertical smooth pursuit task in which the patient is directed to follow a visible dot shown on the head mounted display as it moves through a vertical sinusoidal displacement;

vi) an optokinetic reflex testing task with visible stimuli shown moving on the head mounted display;

vii) a random horizontal saccade task in which the patient is directed to follow a visible dot shown on the head mounted display as it shifts suddenly from one position on the head mounted display to another horizontally shifted position on the head mounted display instantaneously;

viii) a random vertical saccade task in which the patient is directed to follow a visible dot shown on the head mounted display as it shifts suddenly from one position on the head mounted display to another vertically shifted position on the head mounted display instantaneously;

ix) a self-paced saccade task in which two stationary visible dots are presented on the head mounted display and the patient is instructed to generate as many saccades as possible between the two visible dots within a set time period;

x) a predictive saccade task in which patient is presented with a number of pseudo-random saccade stimuli on the head mounted display followed by saccade stimuli on the head mounted display with a repeated displacement and timing;

xi) a light reflex task in which the visible stimuli of varying brightness are presented to the patient on the head mounted display with the platform obtaining pupillary responses;

xii) a vergence task in which the patient is presented with a visible dot on the head mounted display virtually moving toward and away from the patient with the platform recording the vergence responses of the patient's eyes;

xiii) a memory guided sequence task in which the patient are then presented with a sequence of random peripheral temporary visible targets on the head mounted display and subsequently the patient is are directed to look at peripheral target locations on the head mounted display from memory;

xiv) a visual paired comparison task in which the patient is instructed to look at pairs of images presented consecutively on the head mounted display and to indicate when a repeated image appears;

XV) an anti-saccade task in which the patient is presented with a peripheral visible targets on the head mounted display and the patient is instructed to generate an eye movement in the opposite direction; and xvi) a visual search task in which a field of target visible stimuli is presented on the head mounted display where at least one of those targets is different from majority of the remaining targets;

D) assessing the patient's performance of the tasks performed on the platform during periods of the subject's pharmacologically induced neuroplasticity; and E) repeating steps A-D.

12. The neurological rehabilitation method for a traumatic brain injury patient according to claim 11 wherein the tasks include at least five of the tasks listed in C) i)-xvi).

13. The neurological rehabilitation method for a traumatic brain injury patient according to claim 11 wherein the tasks include at least the anti-saccade task.

14. The neurological rehabilitation method for a traumatic brain injury patient according to claim 11 wherein the tasks include at least the memory guided sequence task.

15. The neurological rehabilitation method for a traumatic brain injury patient according to claim 11 wherein the visual and/or vestibular rehabilitation or training tasks performed on the platform with subjects during periods of pharmacologically induced neuroplasticity which are repeated are modified based upon the assessment of prior performances.

16. The neurological rehabilitation method for a traumatic brain injury patient according to claim 11 wherein the tasks include at least ten of the tasks listed in C) i)-xvi).

17. The neurological rehabilitation method for a traumatic brain injury patient according to claim 11 wherein the tasks include at least the vergence task.

18. The neurological rehabilitation method for a traumatic brain injury patient according to claim 11 wherein the tasks include at least one of the subjective visual horizontal task and the subjective visual vertical task.

19. The neurological rehabilitation method for a traumatic brain injury patient according to claim 11 wherein the tasks include at least one of the horizontal smooth pursuit task and the vertical smooth pursuit task.

20. The neurological rehabilitation method for a traumatic brain injury patient according to claim 11 wherein the tasks include at least one of the random horizontal saccade task and the random vertical saccade task.

* * * * *